US012755654B2

(12) United States Patent
Sim et al.

(10) Patent No.: US 12,755,654 B2
(45) Date of Patent: Oct. 6, 2026

(54) SUPPORT PLATE, A DISPLAY DEVICE INCLUDING THE SAME, AND A METHOD OF MANUFACTURING THE SAME

(71) Applicant: SAMSUNG DISPLAY CO., LTD., Yongin-si (KR)

(72) Inventors: Jin Yong Sim, Seongnam-si (KR); Jaiku Shin, Hwaseong-si (KR); Sungyeon Cho, Hwaseong-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 992 days.

(21) Appl. No.: 17/849,880

(22) Filed: Jun. 27, 2022

(65) Prior Publication Data

US 2022/0418118 A1 Dec. 29, 2022

(30) Foreign Application Priority Data

Jun. 28, 2021 (KR) ........................ 10-2021-0083675

(51) Int. Cl.
*G09F 9/30* (2006.01)
*G06F 1/16* (2006.01)

(52) U.S. Cl.
CPC ............ *G09F 9/301* (2013.01); *G06F 1/1652* (2013.01)

(58) Field of Classification Search
CPC ............................... G06F 1/1652; G09F 9/301
See application file for complete search history.

(56) References Cited

U.S. PATENT DOCUMENTS

| | | | | |
|---|---|---|---|---|
| 9,983,424 B2 * | 5/2018 | Kim | .................... | H10K 77/111 |
| 2016/0172623 A1 | 6/2016 | Lee | | |
| 2016/0357052 A1 | 12/2016 | Kim et al. | | |
| 2017/0062532 A1 | 3/2017 | Jeong | | |
| 2019/0165287 A1 | 5/2019 | Tian et al. | | |
| 2020/0004295 A1 | 1/2020 | Paek et al. | | |
| 2020/0209998 A1 * | 7/2020 | Shin | ........................ | G06F 3/044 |
| 2020/0235135 A1 | 7/2020 | Yang | | |
| 2021/0104694 A1 | 4/2021 | Yee | | |
| 2022/0418118 A1 | 12/2022 | Sim et al. | | |

FOREIGN PATENT DOCUMENTS

| | | |
|---|---|---|
| CN | 106486491 A | 3/2017 |
| CN | 107004698 A | 8/2017 |
| CN | 107447190 A | 12/2017 |
| CN | 109585511 A | 4/2019 |

(Continued)

OTHER PUBLICATIONS

Machine Translation of CN-110602274-A (Year: 2019).*

(Continued)

*Primary Examiner* — Sathavaram I Reddy
(74) *Attorney, Agent, or Firm* — F. CHAU & ASSOCIATES, LLC

(57) ABSTRACT

A display device including: a display panel foldable around a folding axis extending in a first direction; and a support plate disposed under the display panel, the support plate including: a first body; a second body disposed in a second direction perpendicular to the first direction from the first body; a connector disposed between the first body and the second body, overlapping the folding axis, and including a plurality of openings; and an insulating layer covering a surface of the connector.

23 Claims, 17 Drawing Sheets

(56) References Cited

FOREIGN PATENT DOCUMENTS

| | | | | | |
|---|---|---|---|---|---|
| CN | 110602274 | A | * | 12/2019 | ......... G02F 1/33305 |
| CN | 112635522 | A | | 4/2021 | |
| CN | 113129738 | A | * | 7/2021 | ........... G06F 3/0446 |
| CN | 217880694 | U | | 11/2022 | |
| KR | 10-2016-0144912 | | | 12/2016 | |
| KR | 10-2019-0032688 | | | 3/2019 | |
| KR | 10-2020-0002576 | A | | 1/2020 | |
| KR | 10-2020-0084495 | | | 7/2020 | |
| KR | 10-2022-0006669 | | | 1/2022 | |
| KR | 10-2022-0007825 | | | 1/2022 | |
| KR | 10-2022-0022926 | | | 3/2022 | |
| KR | 10-2022-0033656 | | | 3/2022 | |

OTHER PUBLICATIONS

Machine Translation of CN 11329738 (Year: 2020).*
Office Action dated Apr. 17, 2026 from the Chinese Patent Office for corresponding Chinese Patent Application No. 202210686397.9.

* cited by examiner

SUPPORT PLATE, A DISPLAY DEVICE INCLUDING THE SAME, AND A METHOD OF MANUFACTURING THE SAME

CROSS-REFERENCE TO RELATED APPLICATION(S)

This application claims priority under 35 U.S.C. § 119 to Korean Patent Application No. 10-2021-0083675 filed on Jun. 28, 2021 in the Korean Intellectual Property Office (KIPO), the disclosure of which is incorporated by reference herein in its entirety.

TECHNICAL FIELD

Embodiments of the present disclosure relate to a support plate. More particularly, embodiments of the present disclosure relate to a support plate applied to a display device, a display device including the support plate, and a method of manufacturing the support plate.

DESCRIPTION OF THE RELATED ART

A display device is a device that displays an image. The display device may include a display panel such as an organic light emitting display panel, a liquid crystal display panel, a quantum dot display panel, or the like.

A mobile electronic device such as a smartphone, tablet, or the like may include a display device to provide an image to a user. A foldable display device that can be folded or unfolded has been developed.

The foldable display device may include a support plate disposed under the display panel to support the display panel when it is bent. The support plate may, however, accumulate charges when the display device is in use.

SUMMARY

A display device according to an embodiment of the present disclosure may include a display device including: a display panel foldable around a folding axis extending in a first direction; and a support plate disposed under the display panel, the support plate including: a first body; a second body disposed in a second direction perpendicular to the first direction from the first body; a connector disposed between the first body and the second body, overlapping the folding axis, and including a plurality of openings; and an insulating layer covering a surface of the connector.

The support plate may further include a protrusion protruding from an edge of the connector.

The protrusion may protrude in the first direction from the edge of the connector.

The insulating layer may cover a surface of the protrusion.

The protrusion may protrude in the second direction from the edge of the connector.

A surface of the protrusion may not be covered by the insulating layer.

The insulating layer may include a plurality of openings respectively corresponding to the openings of the connector.

The display device may further include a digitizer disposed under the support plate.

The digitizer may include: a first portion disposed under the first body; and a second portion disposed under the second body, and spaced from the first portion.

The insulating layer may include chromium carbide (CrC) or an acrylic resin.

The connector may include stainless steel.

Each of the first body and the second body may include polyethylene terephthalate (PET) or glass.

A support plate according to an embodiment of the present disclosure may include a support plate including: a first body; a second body disposed in a first direction from the first body; a connector disposed between the first body and the second body, and including a plurality of openings; an insulating layer covering a surface of the connector; and a bridge connected to an edge of the connector.

The edge of the connector to which the bridge is connected may extend in the first direction.

The edge of the connector to which the bridge is connected may extend in a second direction perpendicular to the first direction.

Each of the connector and the bridge may include stainless steel.

A method of manufacturing a support plate according to an embodiment of the present disclosure may include a method of manufacturing a support plate, the method including: coating a surface of a connector connected to a bridge with an insulating material; forming a first body and a second body on opposite sides of the connector, respectively; and cutting the bridge from the connector.

The surface of the connector may be coated using a spray method or a deposition method.

The method may further include: coating a surface of a protrusion of the connector with the insulating material, the protrusion being exposed by cutting of the bridge.

The surface of the protrusion may be coated with a printing method.

The method may further include: folding the bridge after coating the surface of the connector and before forming the first body and the second body.

A display device according to an embodiment of the present disclosure may include a display panel foldable around a folding axis extending in a first direction; and a support plate disposed under the display panel, the support plate including: a first body; a second body spaced apart from the first body in a second direction perpendicular to the first direction; a connector disposed between the first body and the second body, the connector including a plurality of openings and a protrusion; and an insulating layer disposed on the connector.

The insulating layer may cover the protrusion.

A surface of the protrusion may be exposed by the insulating layer.

In the support plate and the display device according to the embodiments of the present disclosure, the surface of the connector of the support plate may be covered by the insulating layer, so that electric charges may not be accumulated in the support plate. Accordingly, an electromagnetic effect from the support plate to the display panel may decrease, and the display quality of the display device may be increased.

In the method of manufacturing the support plate according to the embodiments of the present disclosure, the surface of the connector of the support plate may be coated with the insulating material, so that the electrical resistance of the support plate may increase, and electric charges may not be accumulated in the support plate.

BRIEF DESCRIPTION OF THE DRAWINGS

Illustrative, non-limiting embodiments of the present disclosure will be more clearly understood from the following detailed description taken in conjunction with the accompanying drawings.

DETAILED DESCRIPTION OF THE EMBODIMENTS

Hereinafter, display devices, support plates, and methods of manufacturing support plates in accordance with embodiments of the present disclosure will be explained in detail with reference to the accompanying drawings.

Figure 1:
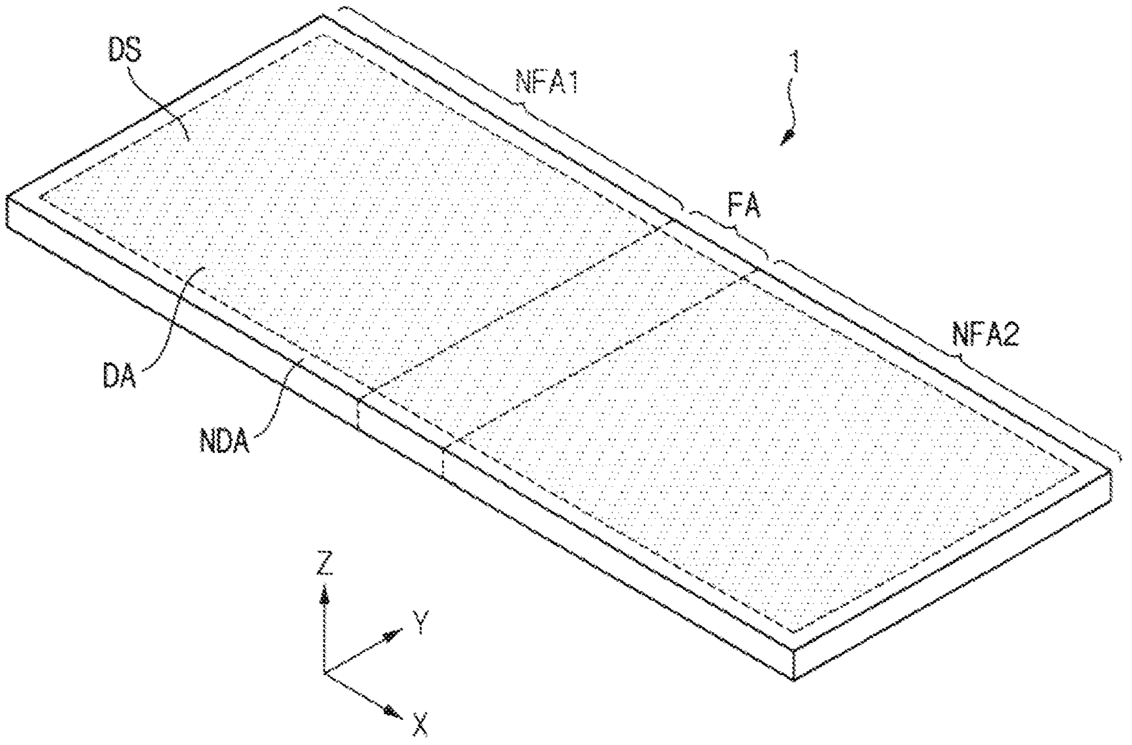
FIG. 1 is a perspective view illustrating a display device according to an embodiment of the present disclosure.
Figure 2:
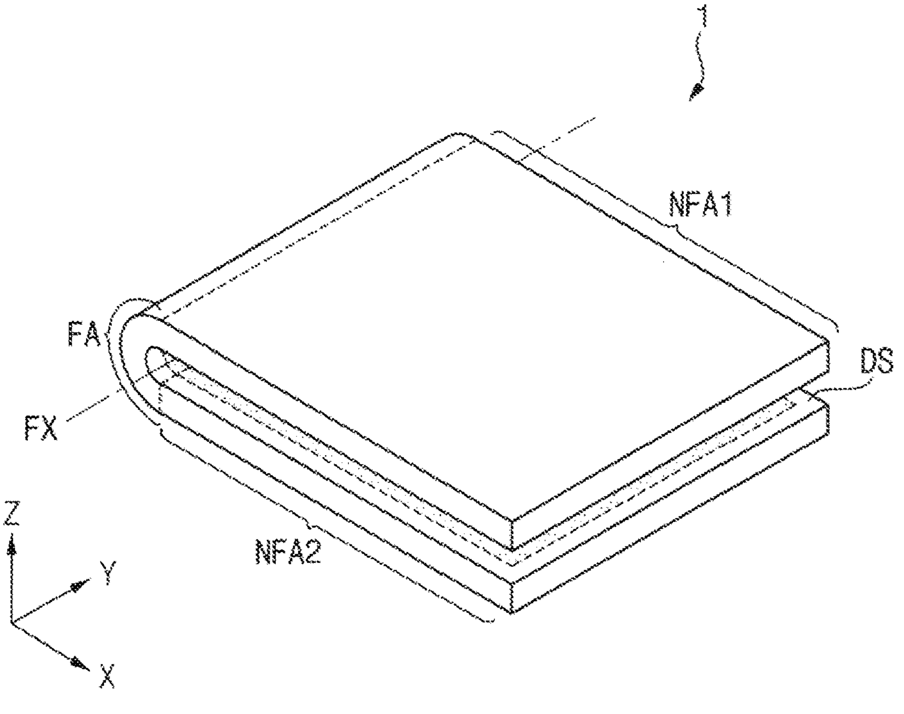
FIG. 2 is a perspective view illustrating a folded state of the display device in FIG. 1.

FIG. 1 is a perspective view illustrating a display device 1 according to an embodiment of the present disclosure. FIG. 2 is a perspective view illustrating a folded state of the display device 1 in FIG. 1.

Hereinafter, a first direction X, a second direction Y, and a third direction Z may be different directions perpendicular to each other. For example, the first direction X may be a length direction, the second direction Y may be a width direction, and the third direction Z may be a thickness direction.

Referring to FIGS. 1 and 2, in an embodiment of the present disclosure, the display device 1 may have a rectangular planar shape. For example, the display device 1 may have opposite long sides extending in the first direction X and opposite short sides extending in the second direction Y perpendicular to the first direction X. However, the shape of the display device 1 is not limited thereto, and the display device 1 may have various shapes. For example, the display device 1 may have curved or rounded edges or sides.

The display device 1 may include a display surface DS. The display device 1 may display an image through the display surface DS. The display surface DS may be disposed over a foldable area FA, a first non-foldable area NFA1 and a second non-foldable area NFA2 which are described below. In an embodiment of the present disclosure, the display surface DS may be a front surface of the display device 1. In another embodiment of the present disclosure, the display surface DS may be the front surface and a rear surface of the display device 1.

The display device 1 may include a display area DA and a non-display area NDA. The display area DA and the non-display area NDA may be provided in each of the foldable area FA, the first non-foldable area NFA1 and the second non-foldable area NFA2. The display area DA may display an image. A plurality of pixels may be disposed in the display area DA.

The non-display area NDA may be disposed around the display area DA. The non-display area NDA may surround at least a portion of the display area DA. For example, the non-display area NDA may be disposed on fewer than all sides of the display area DA. The non-display area NDA may not display an image. A black matrix may be disposed in the non-display area NDA.

The display device 1 may be a foldable display device. The display device 1 may be folded or unfolded. In the present specification, the term ‘folding’ may include ‘bending’. For example, the display device 1 may be folded or unfolded such that a first portion of the display device 1 faces a second portion of the display device 1 or the first portion forms an inclination with respect to the second portion. In an embodiment of the present disclosure, the display device 1 may be folded such that the first portion forms an angle greater than about 0 degrees and less than about 180 degrees with respect to the second portion, or may be unfolded such that the first portion forms an angle of about 180 degrees with respect to the second portion.

The display device 1 relay be folded inwardly (e.g., in-folding) or outwardly (e.g., out-folding). The in-folding may include folding the display device 1 such that a first portion of the display surface DS faces a second portion of the display surface DS, and the out-folding may include folding the display device 1 such that the first portion of the display surface DS does not face the second portion of the display surface DS. In an embodiment of the present disclosure, the in-folding may be in a folded state such that a first portion of the display surface DS forms an angle greater than about 0 degrees and less than about 180 degrees with respect to a second portion of the display surface DS, and the out-folding may be in a folded state such that the first portion of the display surface DS forms an angle greater than about 180 degrees and less than about 360 degrees with respect to the second portion of the display surface DS.

The display device 1 may include the foldable area FA and the first and second non-foldable areas NFA1 and NFA2. The foldable area FA may be an area that is folded or bent when the display device 1 is folded. Each of the first and second non-foldable areas NFA1 and NFA2 may be an area that is not folded or bent when the display device 1 is folded. The second non-foldable area NFA2 may be disposed in the first direction X from the first non-foldable area NFA1, and the foldable area FA may be disposed between the first non-foldable area NFA1 and the second non-folding area NFA2.

The display device 1 may have a folded state or an unfolded state. In the present specification, the folded state may include a bent state. For example, the folded state may be a state in which the first non-foldable area NFA1 forms an inclination with respect to the second non-foldable area NFA2, and the unfolded state may be a state in which the first non-foldable area NFA1 is disposed parallel to the second non-foldable area NFA2 on a plane. In an embodiment of the present disclosure, the folded state may be a state in which the first non-foldable area NFA1 forms an angle greater than about 0 degrees and less than about 180 degrees or greater than about 180 degrees and less than about 360 degrees with respect to the second non-foldable area NFA2, and the unfolded state may be a state in which the first non-foldable area NFA1 forms an angle of about 180 degrees with respect to the second non-foldable area NFA2.

The display device 1 may be folded or unfolded with respect to a folding axis FX. The axis FX may overlap the foldable area FA.

Figure 3:
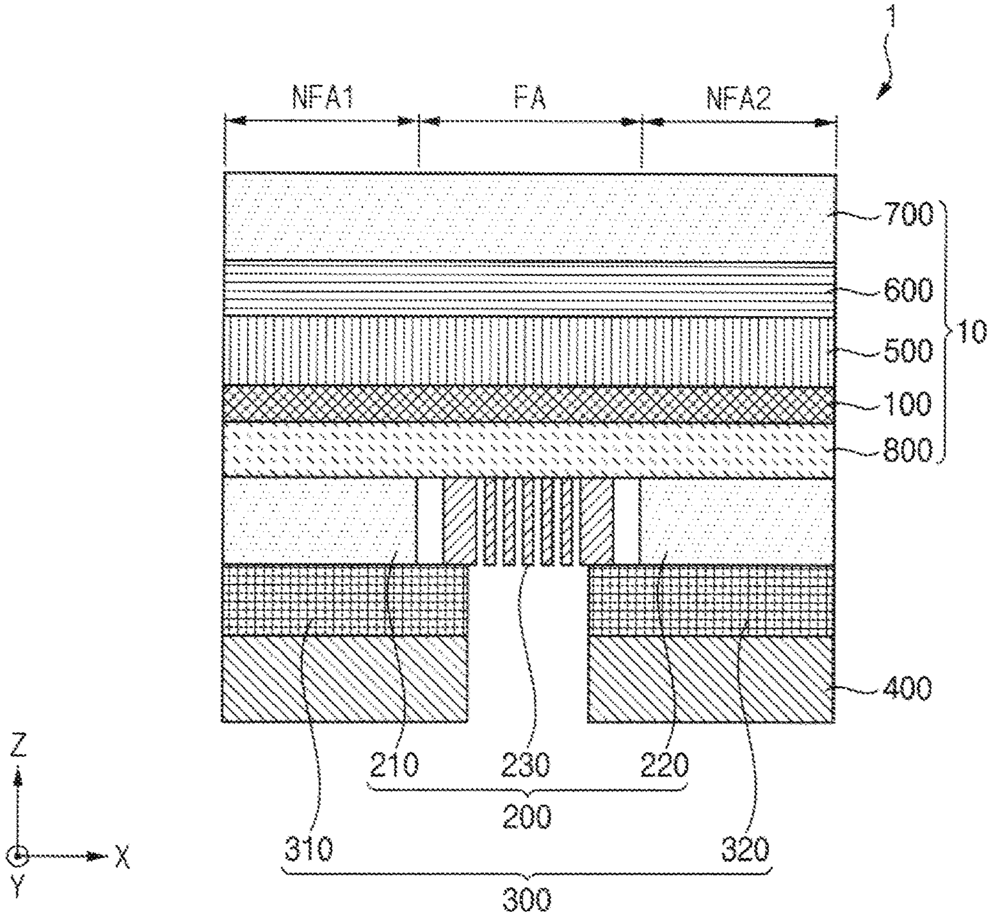
FIG. 3 is a cross-sectional view illustrating a portion of the display device in FIG. 1.

FIG. 3 is a cross-sectional view illustrating a portion of the display device 1 in FIG. 1.

Referring to FIG. 3, the display device 1 may include a display module 10, a support plate 200, a digitizer 300, and a metal plate 400.

The display module 10 may be flexible. The display module 10 may include a display panel 100, a polarizing layer 500, a window 600, a protective layer 700, and a protective film 800.

The display panel 100 may display an image. The display panel 100 may be disposed between the protective film 800 and the polarizing layer 500. The display panel 100 may include an organic light emitting display panel, an inorganic light emitting display panel, a quantum dot light emitting display panel, a micro light emitting diode (LED) display panel, a nano LED display panel, a plasma display panel, a field emission display panel, a cathode ray display panel, a liquid crystal display panel, an electrophoretic display panel, or the like.

The polarizing layer 500 may be disposed on the display panel 100. For example, the polarizing layer 500 may be directly provided on the display panel 100. The polarizing layer 500 may polarize light passing therethrough. The polarizing layer 500 may reduce reflection of external light of the display device 1. In an embodiment of the present disclosure, the polarizing layer 500 may include a polyvinyl alcohol film. The polarizing layer 500 may be stretched in one direction. The stretching direction of the polarizing layer 500 may be an absorption axis, and a direction perpendicular to the stretching direction may be a transmission axis.

The window 600 may be disposed on the polarizing layer 500. For example, the window 600 may be directly provided on the polarizing layer 500. The window 600 may protect the display panel 100. The window 600 may include a transparent material. In an embodiment of the present disclosure, the window 600 may include glass, plastic, or the like.

When the window 600 includes glass, the glass may be ultra thin glass (UTG). When the glass is the ultra thin glass, the glass may be flexible. For example, a thickness of the glass may be about 10 μm to about 300 μm.

The protective layer 700 may be disposed on the window 600. For example, the protective layer 700 may be directly provided on the window 600. The protective layer 700 may prevent scattering of the window 600, absorb shock of the window 600, prevent engraving of the window 600, prevent fingerprints of the window 600, and prevent glare of the window 600. The protective layer 700 may include a transparent polymer film. In an embodiment of the present disclosure, the transparent polymer film may include polyethylene terephthalate (PET), polyethylene naphthalate (PEN), polyethersulfone (PES), polyimide (PI), polyarylate (PAR), polycarbonate (PC), polymethyl methacrylate (PMMA), cyclo olefin polymer (COP), or the like.

The protective film 800 may be disposed under the display panel 100. The protective film 800 may be in direct contact with the display panel 100. The protective film 800 may reduce stress applied to the display panel 100 when the display panel 100 is folded or bent. Further, the protective film 800 may prevent moisture, etc. from penetrating into the display panel 100, and may absorb external shocks.

The protective film 800 may be a plastic film. In an embodiment of the present disclosure, the protective film 800 may include polyimide (PI), polyethylene terephthalate (PET), polycarbonate (PC), polypropylene (PP), polyethersulfone (PES), polymethyl methacrylate (PMMA), triacetyl cellulose (TAC), cyclo olefin polymer (COP), or the like.

The support plate 200 may be disposed under the display module 10. The protective film 800 may be provided between the support plate 200 and the display panel 100. The support plate 200 may be flexible. The support plate 200 may include a first body 210, a second body 220, and a connector 230. The first body 210 may be disposed in the first non-foldable area NFA1, and the second body 220 may be disposed in the second non-foldable area NFA2. The connector 230 may be disposed in the foldable area FA.

The digitizer 300 may be disposed under the display module 10. The support plate 200 may be provided between the digitizer 300 and the display module 10. The digitizer 300 may recognize location information on the display surface DS of the display device 1 indicated by a user as an input device. Accordingly, the display device 1 may provide an input means to the user through the digitizer 300. The digitizer 300 may recognize the movement of an input device (e.g., a stylus pen) on the display surface DS of the display device 1, and may convert the movement into a digital signal.

The digitizer 300 may be disposed under the support plate 200. For example, the digitizer 300 may be disposed under the support plate 200. Since the digitizer 300 is disposed under the support plate 200, the support plate 200 may prevent the digitizer 300 from being viewed by a user through the display surface DS of the display device 1.

The digitizer 300 may include a first portion 310 and a second portion 320. The first portion 310 may be disposed under the first body 210. The first portion 310 may also be disposed under the connector 230 and be in contact with a first portion of the connector 230. The second portion 320 may be disposed under the second body 220. The second portion 320 may also be disposed under the connector 230 and be in contact with a second portion of the connector 230. The second portion 320 may be spaced apart from the first portion 310. The digitizer 300 may be a separate digitizer including the first portion 310 and the second portion 320 which are spaced apart front each other. The connector 230 may overlap an opening formed between the first portion 310 and the second portion 320. In an embodiment of the present disclosure, the first portion 310 and the second portion 320 may be connected by a flexible printed circuit board (FPCB). Since the digitizer 300 includes the first portion 310 and the second portion 320 which are spaced apart from each other, the digitizer 300 may not be damaged by folding of the display device 1.

FIG. 3 further illustrates a first space between the first body 210 of the support plate 200 and the first portion of the connector 230 on the first portion 310 of the digitizer 300, and a second space between the second body 220 of the support plate 200 and the second portion of the connector 230 on the second portion 320 of the digitizer 300.

A cushion layer may be disposed between the support plate 200 and the digitizer 300. The cushion layer may include a synthetic resin. In an embodiment of the present disclosure, the cushion layer may include a thermoplastic polyurethane (TPU).

The metal plate 400 may be disposed under the digitizer 300. The metal plate 400 may include metal. In an embodiment of the present disclosure, the metal plate 400 may include stainless steel. The connector 230 may overlap an opening formed between portions of the metal plate 400. The opening between the portions of the metal plate 400 may correspond to the opening between the first and second portions 310 and 320 of the digitizer 300.

A shielding layer may be disposed between the digitizer 300 and the metal plate 400. The shielding layer may include a metal. In an embodiment of the present disclosure, the shielding layer may include magnetic metal powder (MMP).

Figure 4:
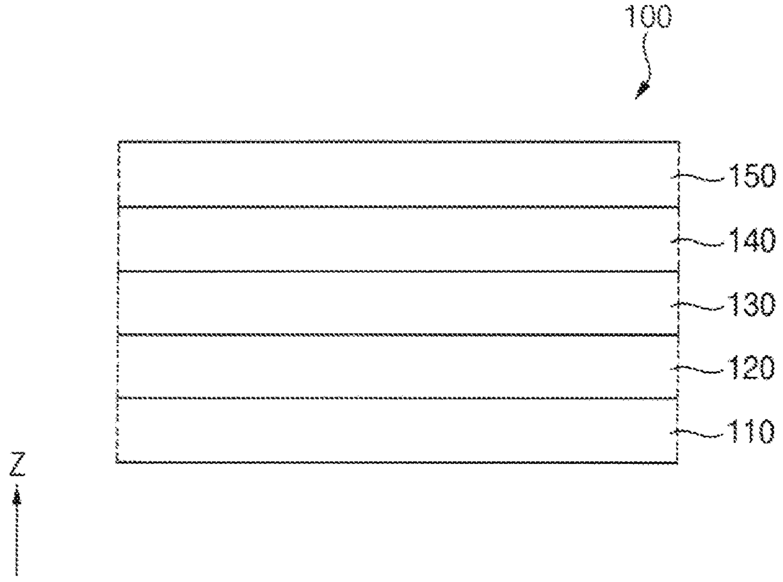
FIG. 4 is a cross-sectional view illustrating a display panel according to an embodiment of the present disclosure.

FIG. 4 is a cross-sectional view illustrating a display panel 100 according to an embodiment of the present disclosure.

Referring to FIG. 4, the display panel 100 may include a substrate 110, a circuit layer 120, an emission layer 130, an encapsulation layer 140, and an input sensing layer 150.

The substrate 110 may be a flexible substrate including a polymer material such as polyimide (PI) or the like. Accordingly, the display panel 100 may be bent or folded.

The circuit layer 120 may be disposed on the substrate 110. The circuit layer 120 may include a circuit for driving the emission layer 130. The circuit layer 120 may include a plurality of transistors.

The emission layer 130 may be disposed on the circuit layer 120 The emission layer 130 may emit light response to a driving signal transmitted from the circuit layer 120. The emission layer 130 may include a plurality of light emitting elements.

The encapsulation layer 140 may be disposed on the emission layer 130. The encapsulation layer 140 may include at least one inorganic encapsulation layer and at least one organic encapsulation layer.

The input sensing layer 150 may be disposed on the encapsulation layer 140. The input sensing layer 150 may sense an input of a user (e.g., a touch), and may convert the input into an electrical signal.

Hereinafter, an example of the support plate after being attached to the display module 10 will be described with reference to FIGS. 5 to 7.

Figure 5:
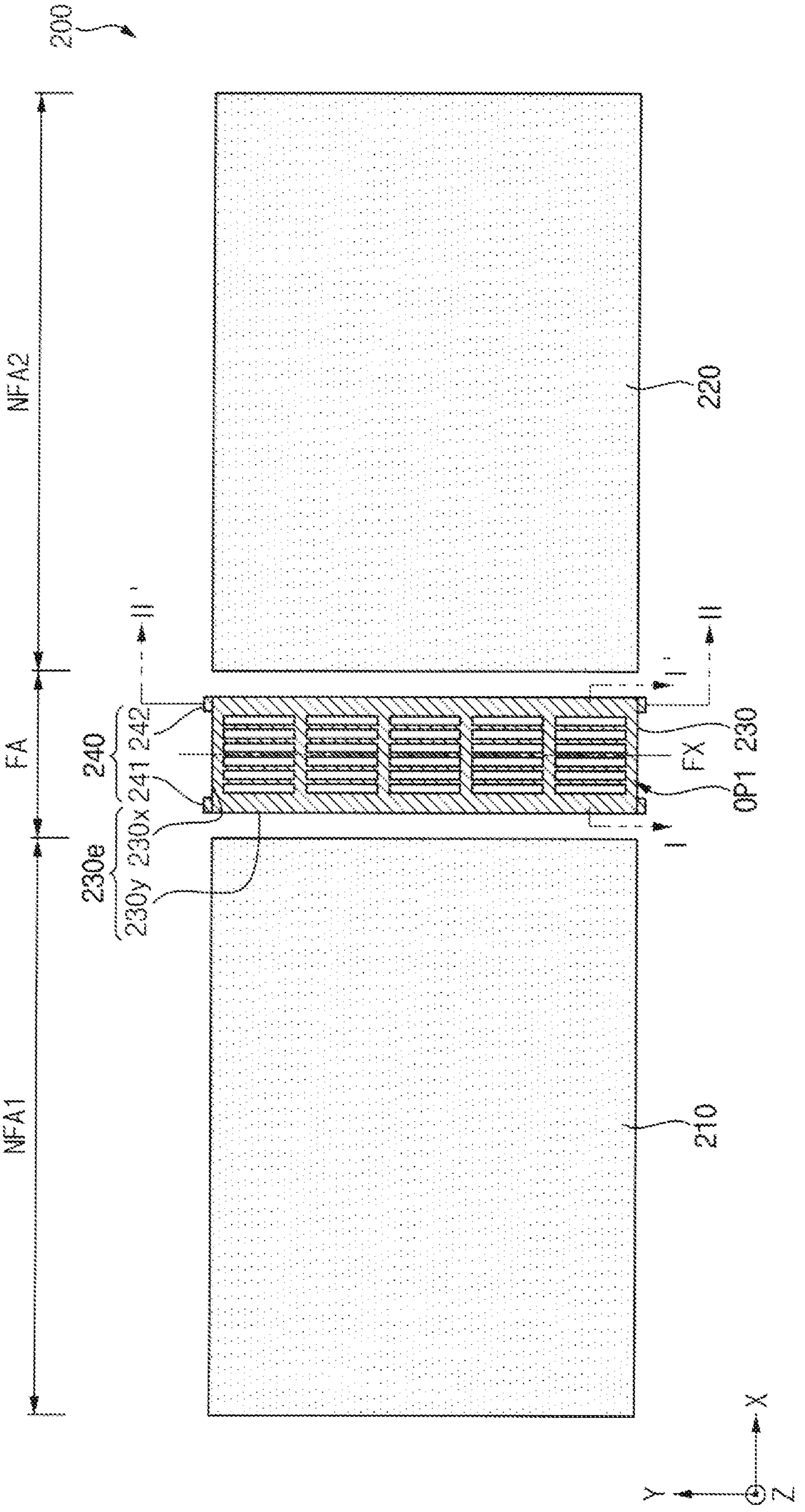
FIG. 5 is a plan view illustrating a support plate according to an embodiment of the present disclosure.

FIG. 5 is a plan view illustrating a support plate 200 according to an embodiment of the present disclosure. FIG. 6 is a cross-sectional view illustrating the support plate 200 taken along a line I-I' in FIG. 5. FIG. 7 is a cross-sectional view illustrating the support plate 200 taken along a line II-II' in FIG. 5. In FIG. 5, an insulating layer 250 to be described below is omitted for convenience of illustration.

Figure 6:
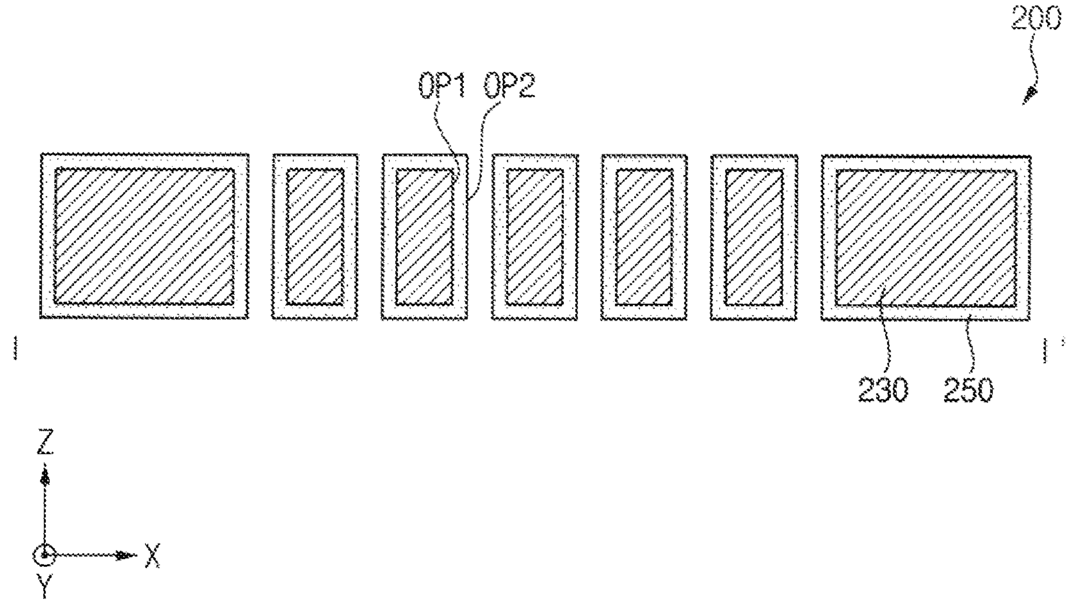
FIG. 6 is a cross-sectional view illustrating the support plate taken along a line I-I' in FIG. 5.
Figure 7:
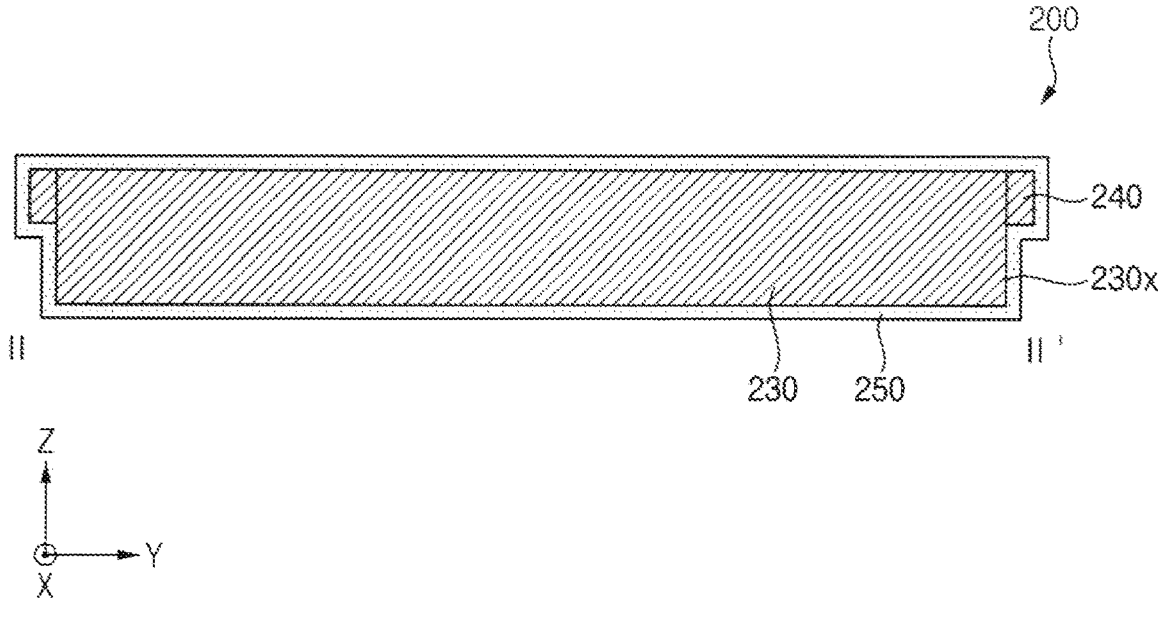
FIG. 7 is across-sectional view illustrating the support plate taken along a line II-II' in FIG. 5.

Referring to FIGS. 5, 6, and 7, the support plate 200 may include a first body 210, a second body 220, a connector 230, a protrusion 240, and an insulating layer 250.

The first body 210 may have a rectangular planar shape. The first body 210 may be disposed in the first non-foldable area NFA1.

The second body 220 may be disposed in a direction perpendicular to the folding axis FX from the first body 210. In other words, the second body 220 may be disposed in the first direction X from the first body 210. The second body 220 may have a rectangular planar shape. The second body 220 may be disposed in the second non-foldable area NFA2.

The first body 210 and the second body 220 may maintain flatness regardless of folding of the display device 1. In other words, when the display device 1 is folded, the first body 210 and the second body 220 may not compressed or expanded, and may maintain their length or size.

Each of the first body 210 and the second body 220 may include an insulating material. In an embodiment of the present disclosure, each of the first body 210 and the second body 220 may include at least one of polyethylene terephthalate (PET) and glass.

The connector 230 may be disposed between the first body 210 and the second body 220. In an embodiment of the present disclosure, the connector 230 may be spaced apart from the first body 210 and the second body 220 at a predetermined distance. For example, the connector 230 may be spaced apart from the first body 210 and the second body 220 with an interval of about 0.2 mm. The connector 230 may be disposed in the foldable area FA. The connector 230 may overlap the folding axis FX.

The connector 230 may have a rectangular planar shape. In an embodiment of the present disclosure, an edge **230*e* of the connector 230 may have opposite first side surfaces 230*x* extending in the first direction X and opposite second side surfaces 230*y* extending in the second direction Y. In an embodiment of the present disclosure, a length of the first side surface 230*x* may be smaller than a length of the second side surface 230*y*. The length of the second side surface 230*y* may be the same as the length of an adjacent side surface of the first body 210 or the second body 220**.

The connector 230 may be flexible. The connector 230 may be expanded or compressed by folding or unfolding of the support plate 200. The connector 230 may reduce tensile stress or compressive stress generated by folding of the support plate 200.

The connector 230 may define a plurality of first openings OP1. In an embodiment of the present disclosure, each of the first openings OP1 may have a rectangular planar shape. In an embodiment of the present disclosure, the first openings OP1 may be arranged in a matrix form along the first direction X and the second direction Y.

The connector 230 may include a metal. In an embodiment of the present disclosure, the connector 230 may include stainless steel. For example, the stainless steel may include at least one of iron (Fe), chromium (Cr), carbon (C), nickel (Ni), silicon (Si), manganese (Mn), and molybdenum (Mo), and an alloy thereof.

The protrusion 240 may protrude from the edge **230*e* of the connector 230. In an embodiment of the present disclosure, the protrusion 240 may protrude in a direction parallel to the folding axis FX from the edge 230*e* of the connector 230. In other words, the protrusion 24 may protrude in the second direction Y from the edge 230*e* of the connector 230. In such an embodiment, the protrusion 240 may protrude in the second direction Y from the first side surface 230*x* of the connector 230**.

In an embodiment of the present disclosure, the protrusion 240 may include a first protrusion 241 and a second protrusion 242. The first protrusion 241 and the second protrusion 242 may be symmetrically disposed with respect to the folding axis FX on the first side surface **230*x* of the connector 230. In other words, the first protrusion 241 and the second protrusion 242 may be formed at opposite portions of the first side surface 230*x* of the connector 230**.

Figure 8:
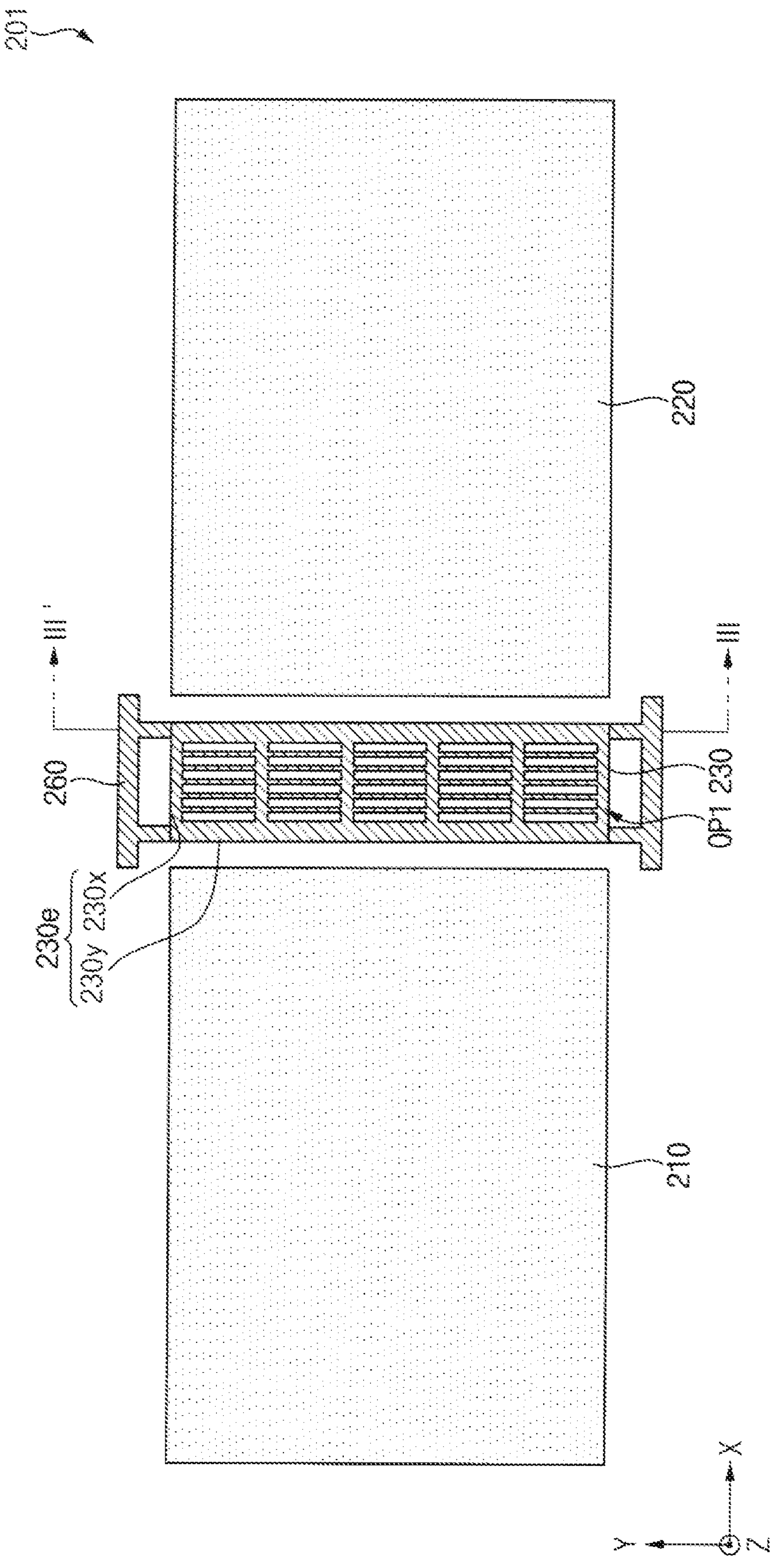
FIG. 8 is a plan view illustrating a support plate according to an embodiment of the present disclosure.

The protrusion 240 may be formed when a bridge 260 in FIG. 8 is cut from the connector 230, which will be described below. Cut ends of the bridge 260 may remain on the edge **230*e* of the connector 230 to form the first protrusion 241 and the second protrusion 242**.

The protrusion 240 may be integrally formed with the connector 230. In an embodiment of the present disclosure, the protrusion 240 may include stainless steel.

The insulating layer 250 may cover a surface of the connector 230. For example, the insulating layer 250 may surround the connector 230. The surface of the connector 230 may not be exposed to the outside. Since the insulating layer 250 covers the surface of the connector 230 including a metal, electric charges supplied from the outside may not be accumulated in the connector 230.

The insulating layer 250 may be disposed along the profile of the surface of the connector 230. Accordingly, the insulating layer 250 may define a plurality of second openings OP2 respectively corresponding to the first openings OP1 of the connector 230. In this case, the second openings OP2 correspond to a space between the insulating layer 250 around adjacent portions of the connector 230, and the first openings OP1 correspond to a space between edges of adjacent portions of connector 230.

In an embodiment of the present disclosure, the insulating layer 250 may cover a surface of the protrusion 240. The surface of the protrusion 240 may not be exposed to the outside. Since the protrusion 240 protrudes in the second direction Y from the first side surface 230*x* of the connector 230, electric charges supplied from the outside may be accumulated in the connector 230 through the protrusion 240 when the surface of the protrusion 240 is not covered by the insulating layer 250. In the present embodiment, however, since the insulating layer 250 covers the surface of the protrusion 240 including the metal, electric, charges supplied from the outside may not be accumulated in the connector 230 through the protrusion 240.

The insulating layer 250 may include an insulating material. In an embodiment of the present disclosure, the insulating layer 250 may include at least one of chromium carbide (CrC) and an acrylic resin.

When the support plate 200 does not include the insulating layer 250, an electrical resistance of the support plate 200 may be relatively low. Thus, electric charges flowing into the display device 1 through the protective layer 700, the window 600, and/or the polarizing layer 500 from the outside may be accumulated in the support plate 200. When electric charges are accumulated in the support plate 200, an electric field ma be formed between the support plate 200 and the display panel 100. Accordingly, the electric field may affect the circuit layer 120 of the display panel 100, thereby degrading the display quality of the display panel 100.

However, in the present embodiment, since the support plate 200 includes the insulating layer 250 covering the surface of the connector 230 and the surface of the protrusion 240, the electrical resistance of the support plate 200 may increase, and electric charges may not be accumulated in the support plate 200. Accordingly, the display quality of the display panel 100 may be increased.

The display device 1 according to an embodiment of the present disclosure may include: a display panel 100 foldable around a folding axis FX extending in a first direction Y; and a support plate 200 disposed under the display panel 100, the support plate 200 including: a first body 210; a second body 220 disposed in a second direction X perpendicular to the first direction Y from the first body 210; a connector 230 disposed between the first body 210 and the second body 220, overlapping the folding axis FX, and including a plurality of openings OP1; and an insulating layer 250 covering a surface of the connector 230.

Hereinafter, an example of the support plate before being attached to the display module 10 will be described with reference to FIGS. 8 and 9.

FIG. 8 is a plan view illustrating a support plate 201 according to an embodiment of the present disclosure. FIG. 9 is a cross-sectional view illustrating the support plate 201 taken along a line III-III' in FIG. 8. In FIG. 8, an insulating layer 250 to be described below is omitted for convenience of illustration.

Figure 9:
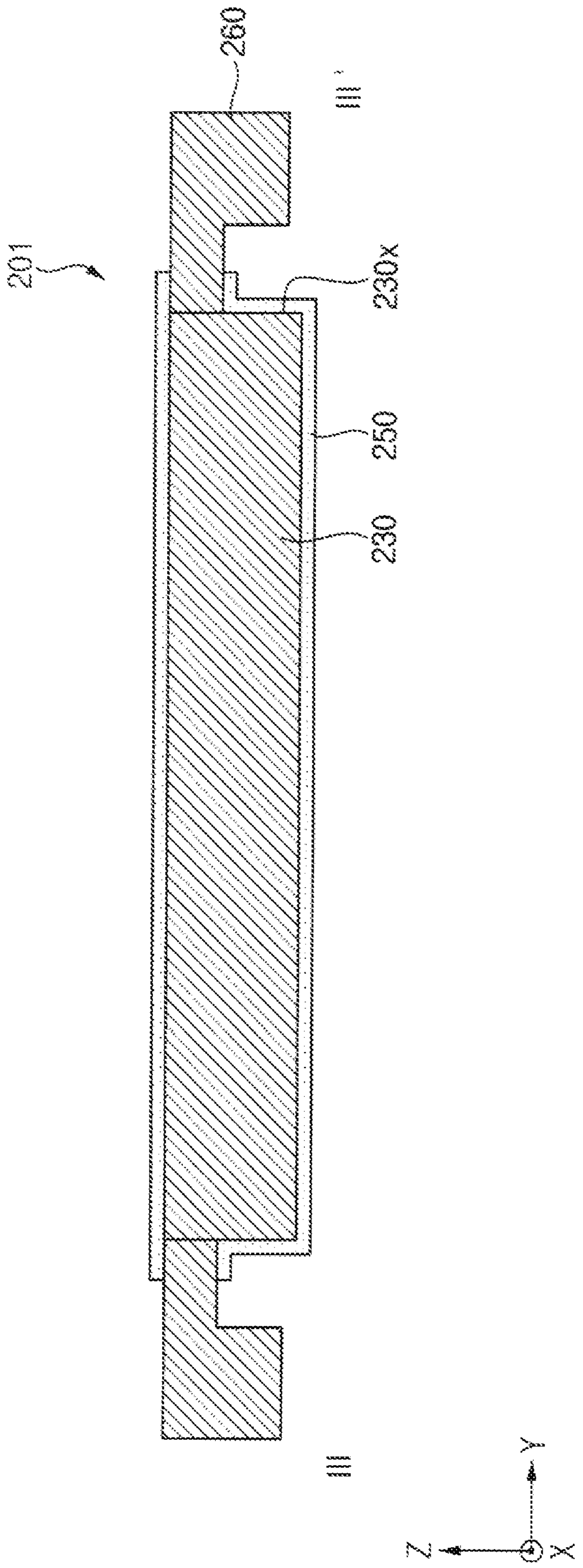
FIG. 9 is a cross-sectional view illustrating the support plate taken along a line III-III' in FIG. 8.

Referring to FIGS. 8 and 9, the support plate 201 may include a first body 210, a second body 220, a connector 230, an insulating layer 250, and a bridge 260. The support plate 201 described with reference to FIGS. 8 and 9 may be substantially the same as or similar to the support plate 200 described with reference to FIGS. 5 to 7, except for further including the bridge 260. Accordingly, descriptions of the overlapping components will be omitted.

The bridge 260 may be connected to the edge 230*e* of the connector 230. The bridge 260 may limit extension and compression of the connector 230 within a predetermined range. Accordingly, the bridge 260 may reduce or substantially prevent deformation of the connector 230.

In an embodiment of the present disclosure, the support plate 201 may include a pair of bridges 260. The pair of bridges 260 may be disposed with the connector 230 interposed therebetween. A gap may be provided between a lengthwise portion of the bridge 260 and the first side surface 230*x* of the connector 230.

In an embodiment of the present disclosure, the bridge 260 may be connected to the first side surface 230*x* of the connector 230. In such, an embodiment, the pair of bridges 260 may be symmetrically disposed with respect to the lust direction X on the opposite first side surfaces 230*x* of the connector 230, respectively.

In an embodiment of the present disclosure, a first end of the bridge 260 may be connected to a first side of the first side surface 230*x* of the connector 230, and a second end of the bridge 260 may be connected to a second side the first side surface 230*x* of the connector 230.

The bridge 260 may be integrally formed with the connector 230. In an embodiment of the present disclosure, the bridge 260 may include stainless steel.

The bridge 260 may be cut before the support plate 201 is attached to the display module 10. The first and second ends of the bridge 260 to be cut may remain on the first side surface 230*x* of the connector 230 to form the first protrusion 241 and the second protrusion 242.

Figure 10:
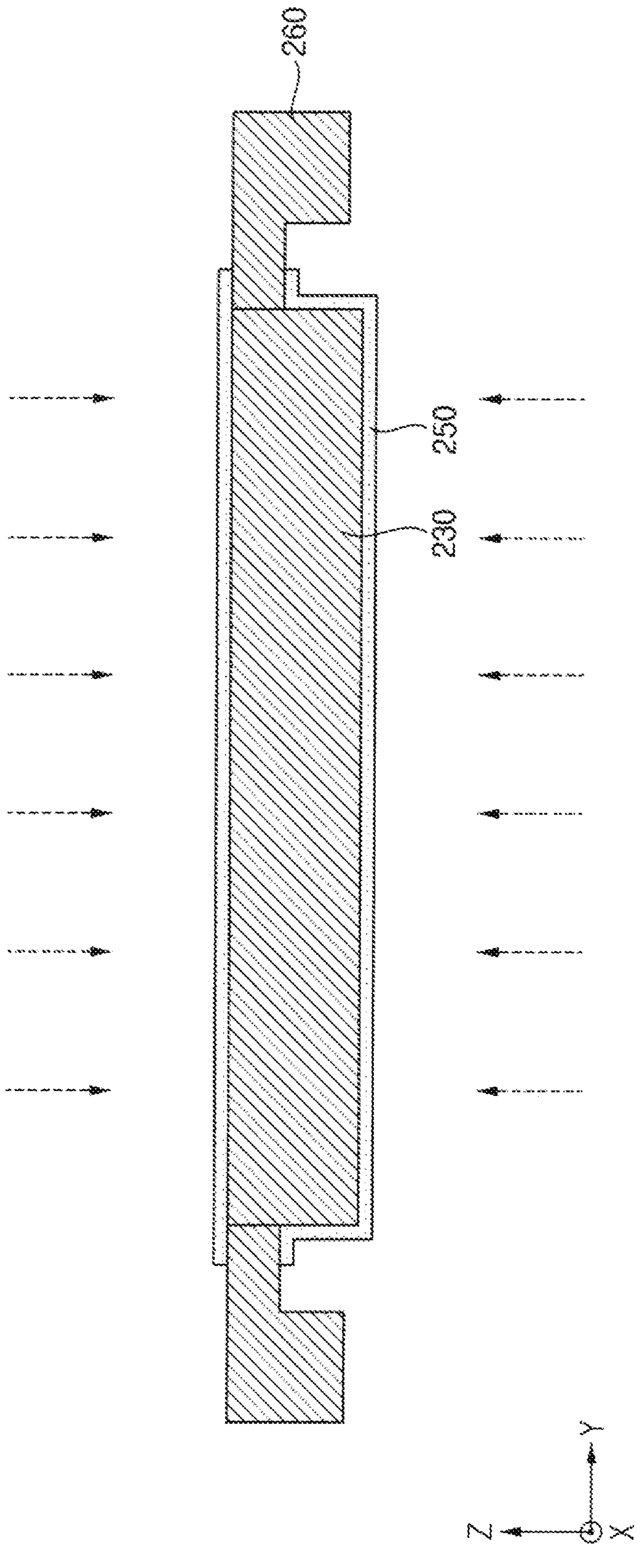
FIGS. 10, 11, and 12 are diagrams illustrating a method of manufacturing a support plate according to an embodiment of the present disclosure.
Figure 11:
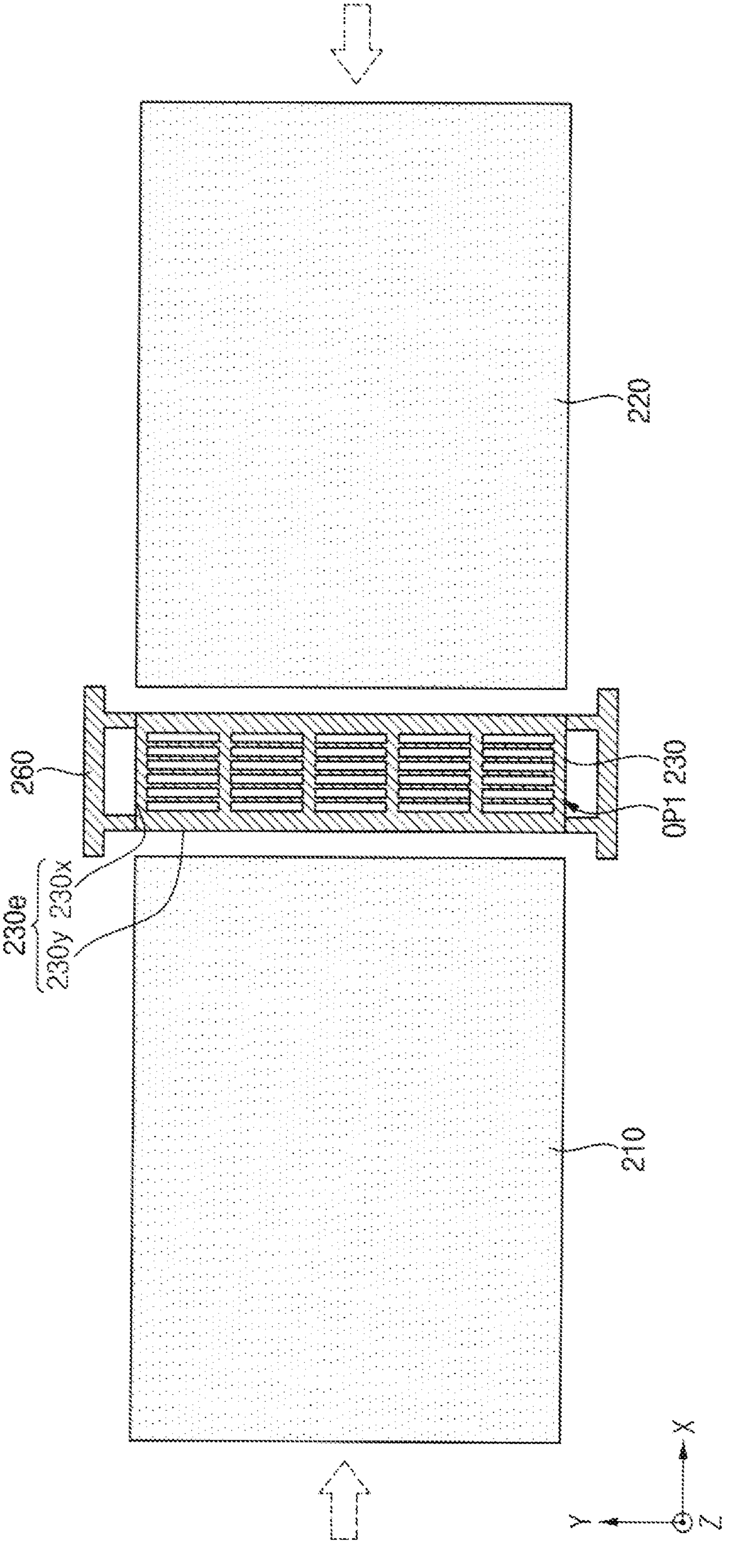
Figure 12:
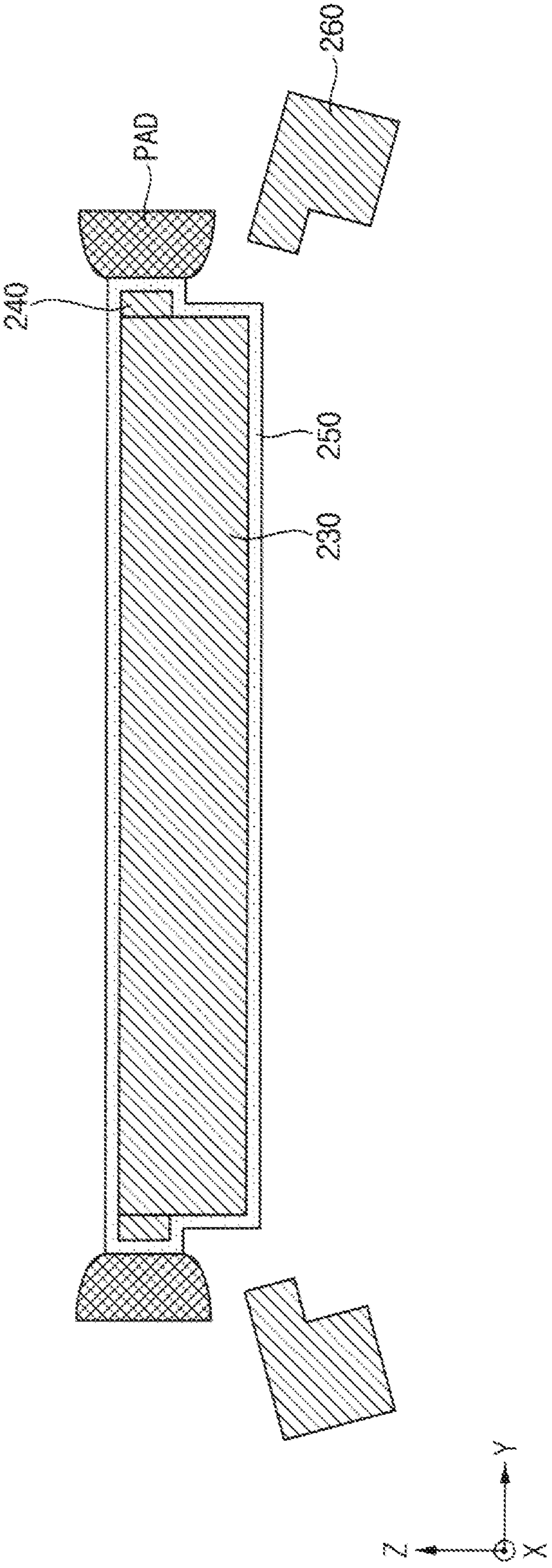

FIGS. 10, 11, and 12 are diagrams illustrating a method of manufacturing a support plate according to an embodiment of the present disclosure. For example, FIGS. 10 to 12 may illustrate a method of manufacturing the support plate 200 described with reference to FIGS. 5 to 7.

Referring to FIG. 10, a surface of the connector 230 connected to the bridge 260 may be coated with an insulating material. The bridge 260 may prevent the connector 230 from being deformed in the process of coating the surface of the connector 230. As the surface of the connector 230 is coated with the insulating material, the insulating layer 250 may be formed on the surface of the connector 230. For example, the insulating layer 250 may be formed on the surface of the connector 230 but not on a portion of the bridge 260 protruded from the connector 230.

The surface of the connector 230 may be coated by one of a spray method and a deposition method. In an embodiment of the present disclosure, an acrylic paint may be coated on the surface of the connector 230 using the spray method. An electrical resistance of the connector 230 coated with the acrylic paint by the spray method may be, for example, about 0.8Ω to about 30 kΩ. In another embodiment of the present disclosure, a chromium carbide (CrC) paint may be coated on the surface of the connector 230 using the deposition method. An electrical resistance of the connector 230 coated with the chromium carbide (CrC) paint by the deposition method may be, for example, about 0.4 kΩ to about 6 MΩ.

Referring to FIG. 11, the first body 210 and the second body 220 may be formed on opposite sides of the connector 230, respectively. The first body 210 and the second body 220 may be formed to be adjacent to opposite second side surfaces 230*y* of the connector 230 in the first direction X, respectively.

In an embodiment of the present disclosure, after the connector 230 is seated on a jig, the first body 210 and the second body 220 may be disposed on the jig to be adjacent to opposite sides of the connector 230, respectively. A guide block may be disposed on the jig to maintain a predetermined distance between the connector 230 and the first and second bodies 210 and 220. In other words, a space may be formed between the connector 230 and the first and second bodies 210 and 220.

Referring to FIG. 12, the bridge 260 may be cut from the connector 230. In art embodiment of the present disclosure, the bridge 260 may be cut by applying a physical force to the bridge 260 using a jig for removing the bridge 260.

In the process in which the bridge 260 is cut, a portion of the bridge 260 may remain on the edge 230*e* of the connector 230 to form the protrusion 240. In this case, a surface of the protrusion 240, which is a cut surface of the bridge 260, may be exposed to the outside.

To prevent the surface of the protrusion 240 from being exposed to the outside, the surface of the protrusion 240 exposed to the outside may be coated with the insulating material. The surface of the protrusion 240 may be coated by a priming method. In an embodiment of the present disclosure, the jig for removing the bridge 260 may include a pad PAD containing the insulating material, and the pad PAD may contact the surface of the protrusion 240 so that the surface of the protrusion 240 the may be coated with the insulating material. In this case, the surface of the protrusion 240 and the surface of the connector 230 are covered by the insulating layer 250. The pad PAD may then be removed.

Hereinafter, an example of the support plate after being attached to the display module 10 will be described with reference to FIGS. 13 and 14.

Figure 13:
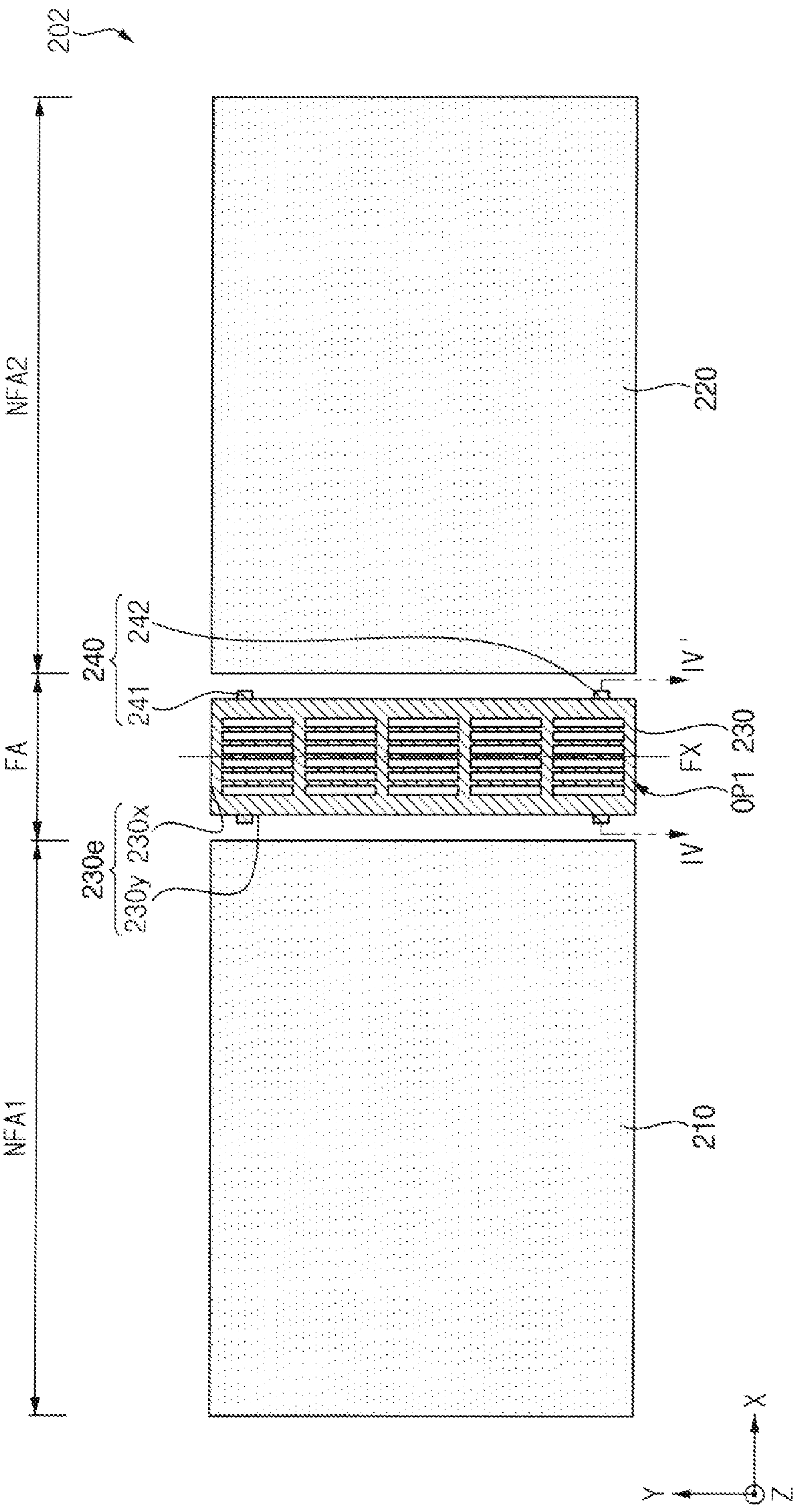
FIG. 13 is a plan view illustrating a support plate according to an embodiment of the present disclosure.

FIG. 13 is a plan view illustrating a support plate 202 according to an embodiment of the present disclosure. FIG. 14 is a cross-sectional view illustrating the support plate 202 taken along a line IV-IV' in FIG. 3. In FIG. 13, an insulating layer 250 to be described below is omitted for convenience of illustration.

Figure 14:
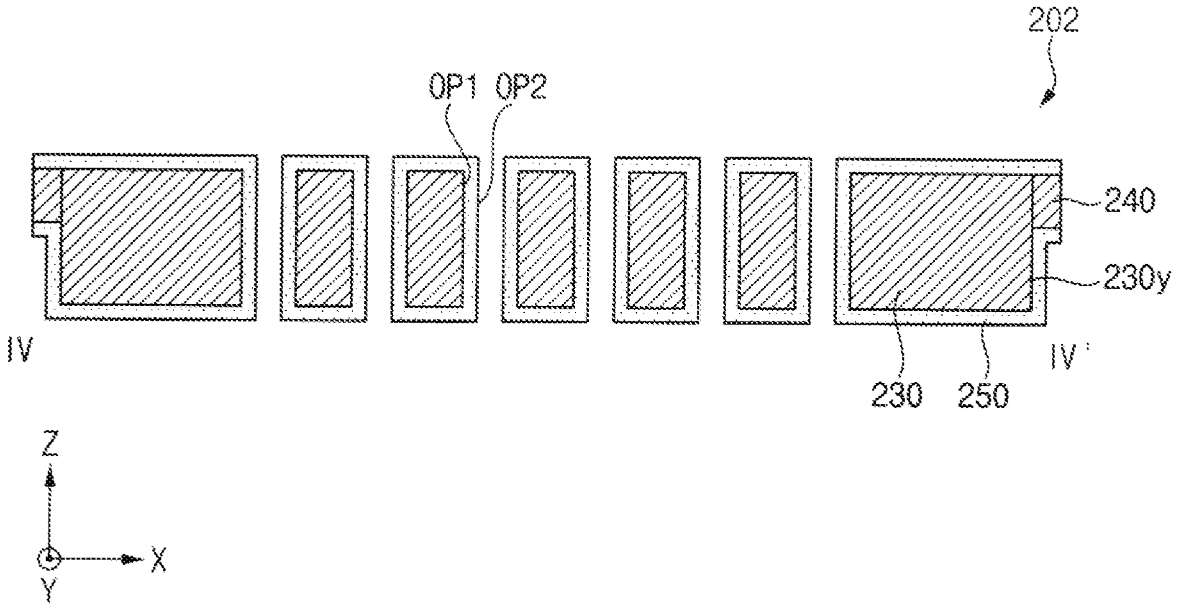
FIG. 14 is a cross-sectional view illustrating the support plate taken along a line IV-IV' in FIG. 13.

Referring to FIGS. 13 and 14, the support plate 202 may include a first body 210, a second body 220, a connector 230, a protrusion 240, and an insulating layer 250. The support plate 202 described with reference to FIGS. 13 and 14 may be substantially the same as or similar to the support plate 200 described with reference to FIGS. 5 to 7 except for the position of the protrusion 240. Accordingly, descriptions of the overlapping components will be omitted.

The protrusion 240 may protrude from the edge 230*e* of the connector 230. In an embodiment of the present disclosure, the protrusion 240 may protrude in a direction perpendicular to the folding axis FX from the edge 230*e* of the connector 230. In other words, the protrusion 240 may protrude in the first direction X from the edge 230*e* of the connector 230. In such an embodiment, the protrusion 240 may protrude in the first direction X from the second side surface 230*y* of the connector 230. The protrusion 240 may be positioned anywhere along the second side surface 230*y* of the connector 230, and thus, is not limited to the positioning shown in FIG. 13.

In an embodiment of the present disclosure, the protrusion 240 may include a first protrusion 241 and a second protrusion 242. The first protrusion 241 and the second protrusion 242 may be symmetrically disposed with respect to a direction perpendicular to the folding axis FX on the second side surface 230*y* of the connector 230.

In an embodiment of the present disclosure, a surface of the protrusion 240 may be exposed to the outside. The insulating layer 250 may not cover the surface of the protrusion 240. Since the protrusion 240 protrudes in the first direction X from the second side surface 230*y* of the connector 230, although the surface of the protrusion 240 is not covered by the insulating layer 250, the first body 210, the second body 220, layers disposed over the support plate 202, and layers disposed under the support plate 202 may cover the surface of the protrusion 240. Accordingly, electric charges supplied from the outside may not be accumulated in the connector 230 through the protrusion 240, Hereinafter, an example of the support plate before being attached to the display module 10 will be described with reference to FIGS. 15 and 16.

Figure 15:
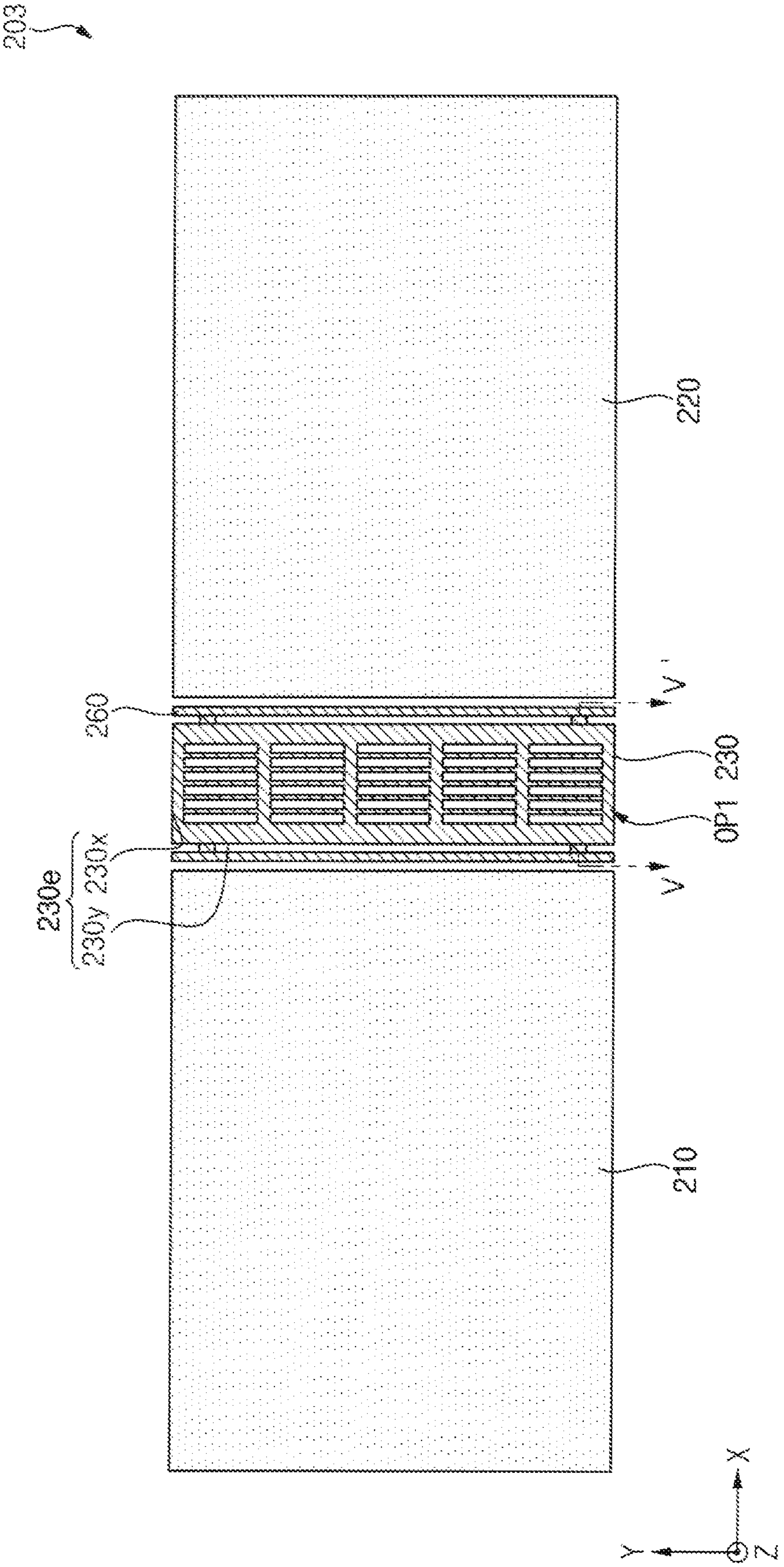
FIG. 15 is a plan view illustrating a support plate according to an embodiment of the present disclosure.
Figure 16:
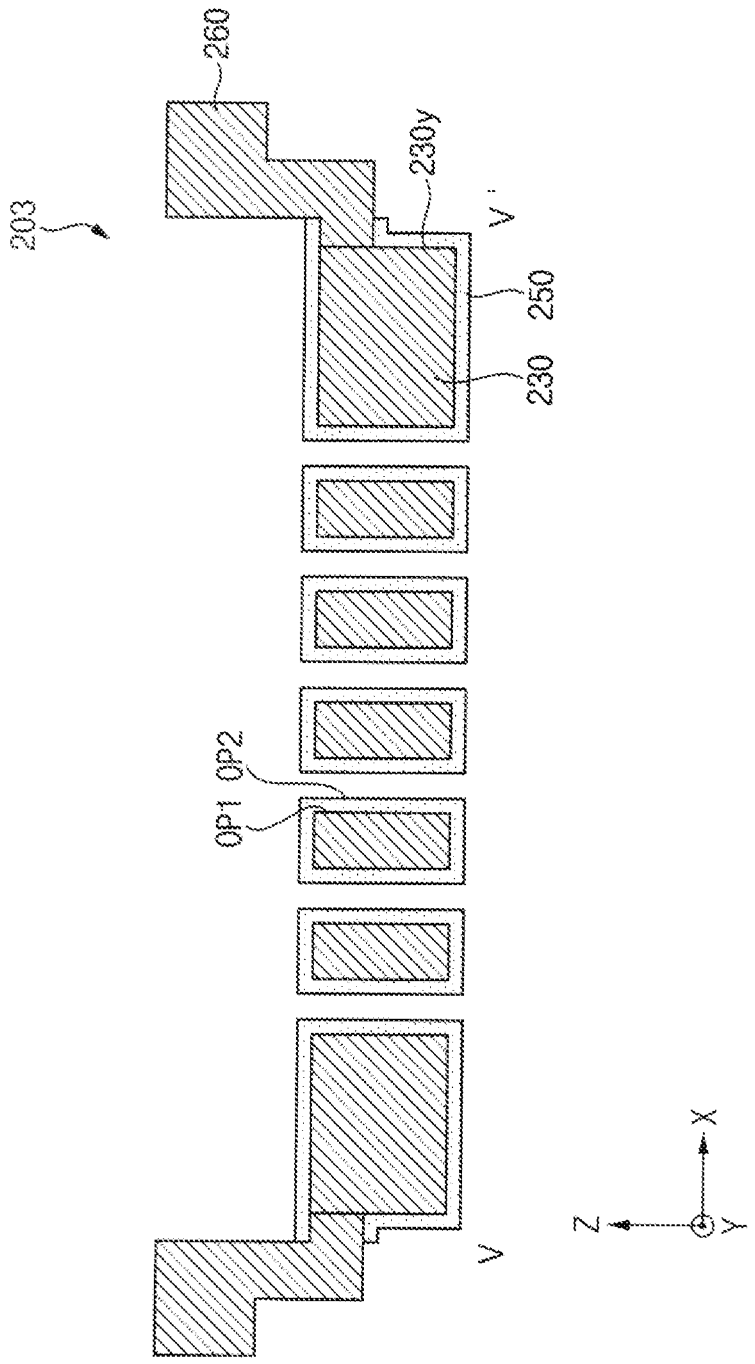
FIG. 16 is a cross-sectional view illustrating the support plate taken along a line V-V' in FIG. 15.

FIG. 15 is a plan view illustrating a support plate 203 according to an embodiment of the present disclosure. FIG. 16 is a cross-sectional view illustrating the support plate 203 taken along a line V-V' in FIG. 15. In FIG. 15, an insulating layer 250 to be described below is omitted for convenience of illustration.

Referring to FIGS. 15 and 16, the support plate 203 may include a first body 210, a second body 220, a connector 230, an insulating layer 250, and a bridge 260. The support plate 203 described with reference to FIGS. 15 and 16 may be substantially the same as or similar to the support plate 202 described with reference to FIGS. 13 and 14 except for further including a bridge 260. Accordingly, descriptions of the overlapping components will be omitted.

The bridge 260 may be connected to the edge 230*e* of the connector 230. The bridge 260 may limit extension and compression of the connector 230 within a predetermined range. Accordingly, the bridge 260 may reduce or substantially prevent deformation of the connector 230.

In an embodiment of the present disclosure, the support plate 203 may include a pair of bridges 260. The pair of bridges 260 may be disposed with the connector 230 interposed therebetween.

In an embodiment of the present disclosure, the bridge 260 may be connected to the second side surface 230*y* of the connector 230. In such an embodiment, the pair of bridges 260 may be symmetrically disposed with respect to the second direction Y on opposite second side surfaces 230*y* of the connector 230, respectively. For example, a tint part of the bridge 260 may be formed between the second side surface 230*y* of the connector 230 and the first body 210, and a second part of the bridge 260 may be formed between the second side surface 230*y* of the connector 230 and the second body 220.

In an embodiment of the present disclosure, a first end of the bridge 260 may be connected to a first side of the second side surface 230*y* of the connector 230, and a second end of the bridge 260 may be connected to a second side of the second side surface 230*y* of the connector 230.

The bridge 260 may be integrally formed with the connector 230. In an embodiment of the present disclosure, the bridge 260 may include stainless steel.

The bridge 260 may be folded or bent such that the bridge 260 forms an inclination with respect to the connector 230. In an embodiment of the present disclosure, the bridge 260 may be folded such that the bridge 260 forms an angle greater than about 0 degrees and less than or equal to about 90 degrees with respect to the connector 230.

The bridge 260 may be cut before the support plate 203 is attached to the display module 10. The first end and the second end of the bridge 260 to be cut may remain on the second side surface 230*y* of the connector 230 to form the first protrusion 241 and the second protrusion 242.

FIGS. 17, 18, 19, and 20 are diagrams illustrating a method of manufacturing a support plate according to an embodiment of the present disclosure. For example, FIGS. 17 to 20 may illustrate a method of manufacturing the support plate 202 described with reference to FIGS. 13 and 14.

Figure 17:
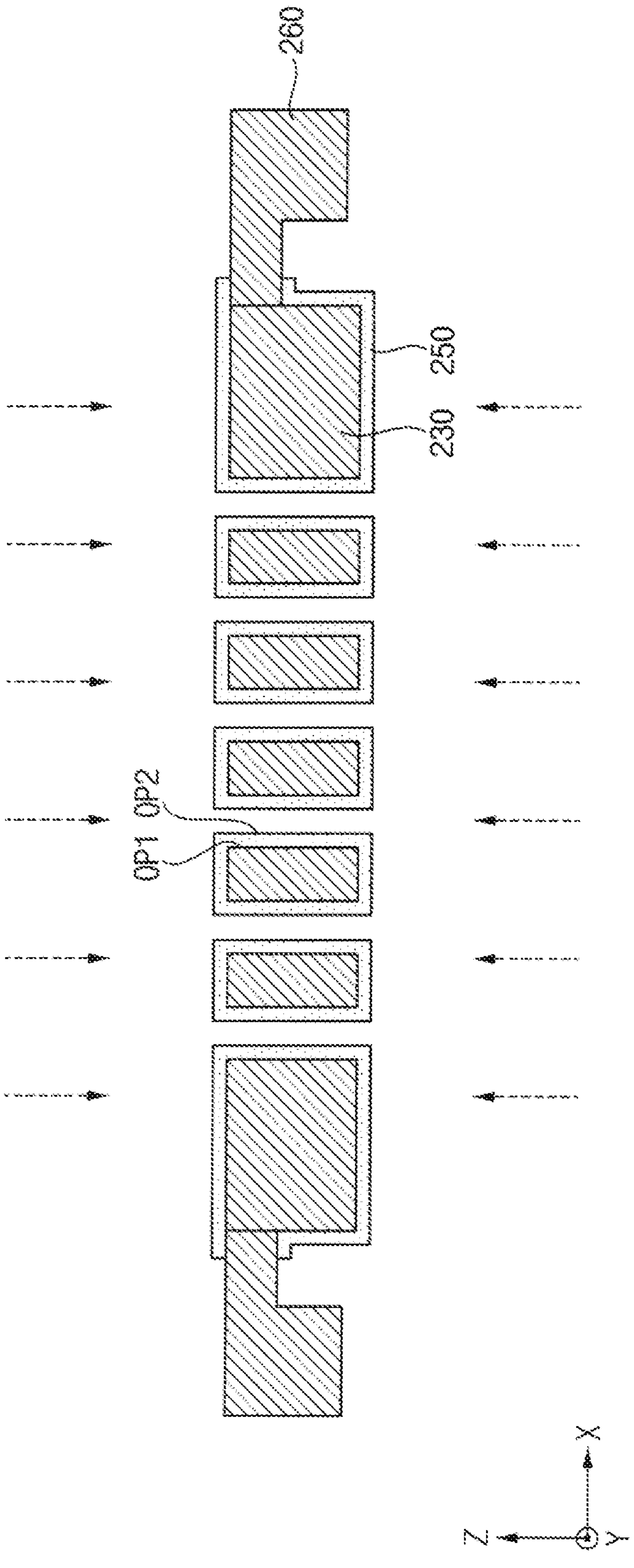
FIGS. 17, 18, 19, and 20 are diagrams illustrating a method of manufacturing a support plate according to an embodiment of the present disclosure.

Referring to FIG. 17, a surface of the connector 230 connected to the bridge 260 may be coated with an insulating material. The bridge 260 may prevent the connector 230 from being deformed in the process of coating the surface of the connector 230. Since the surface of the connector 230 is coated with the insulating material, the insulating layer 250 may be formed on the surface of the connector 230.

The surface of the connector 230 may be coated by one of a spray method sand a deposition method. In an embodiment of the present disclosure, an acrylic paint may be coated on the surface of the connector 230 using the spray method. An electrical resistance of the connector 230 coated with the acrylic paint by the spray method may be, for example about 0.8Ω to about 30 kΩ. In another embodiment of the present disclosure, a chromium carbide (CrC) paint may be coated on the surface of the connector 230 using the deposition method. The electrical resistance of the connector 230 coated with the chromium carbide (CrC) paint by the deposition method may be, for example, about 0.4 kΩ to about 6 MΩ.

Figure 18:
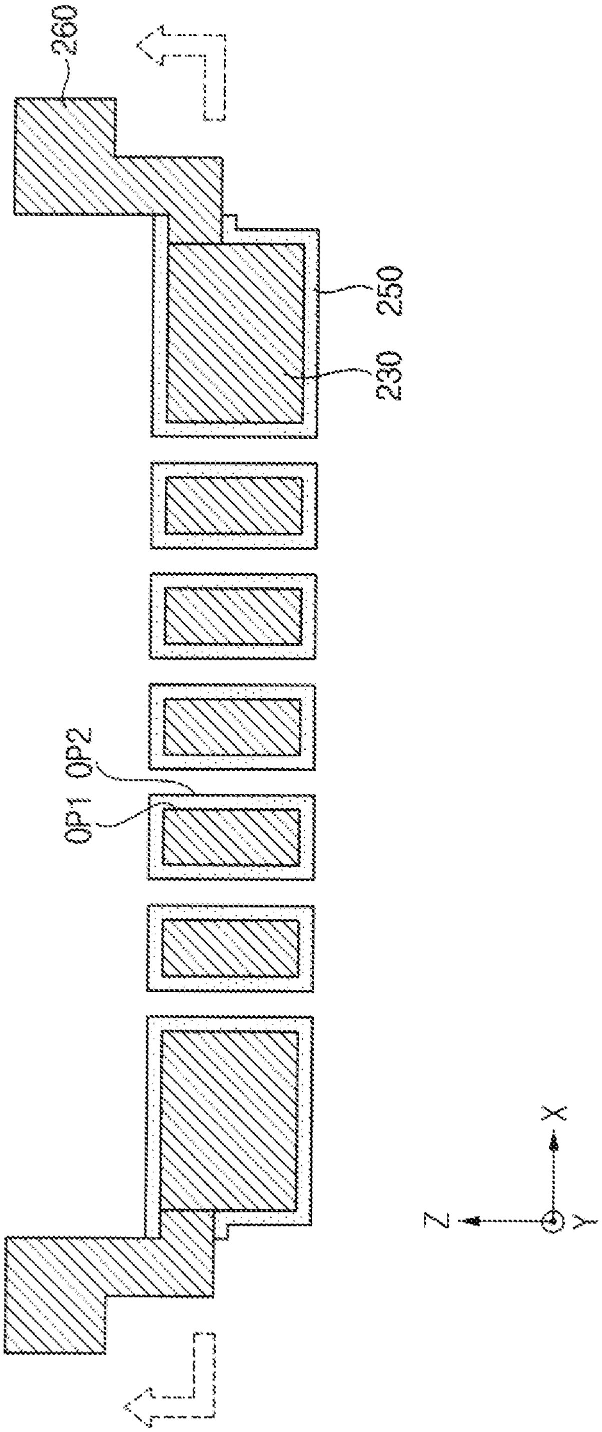

Referring to FIG. 18, the bridge 260 may be folded. In comparison to FIG. 17, the bridge 260 may be folded upwards. In an embodiment of the present disclosure, the bridge 260 may be folded such that the bridge 260 forms an angle greater than about 0 degrees and less than or equal to about 90 degrees with respect to the connector 230. As the bridge 260 is folded, the first body 210 and the second body 220 may be formed on opposite sides of the connector 230 in a subsequent process, respectively.

Figure 19:
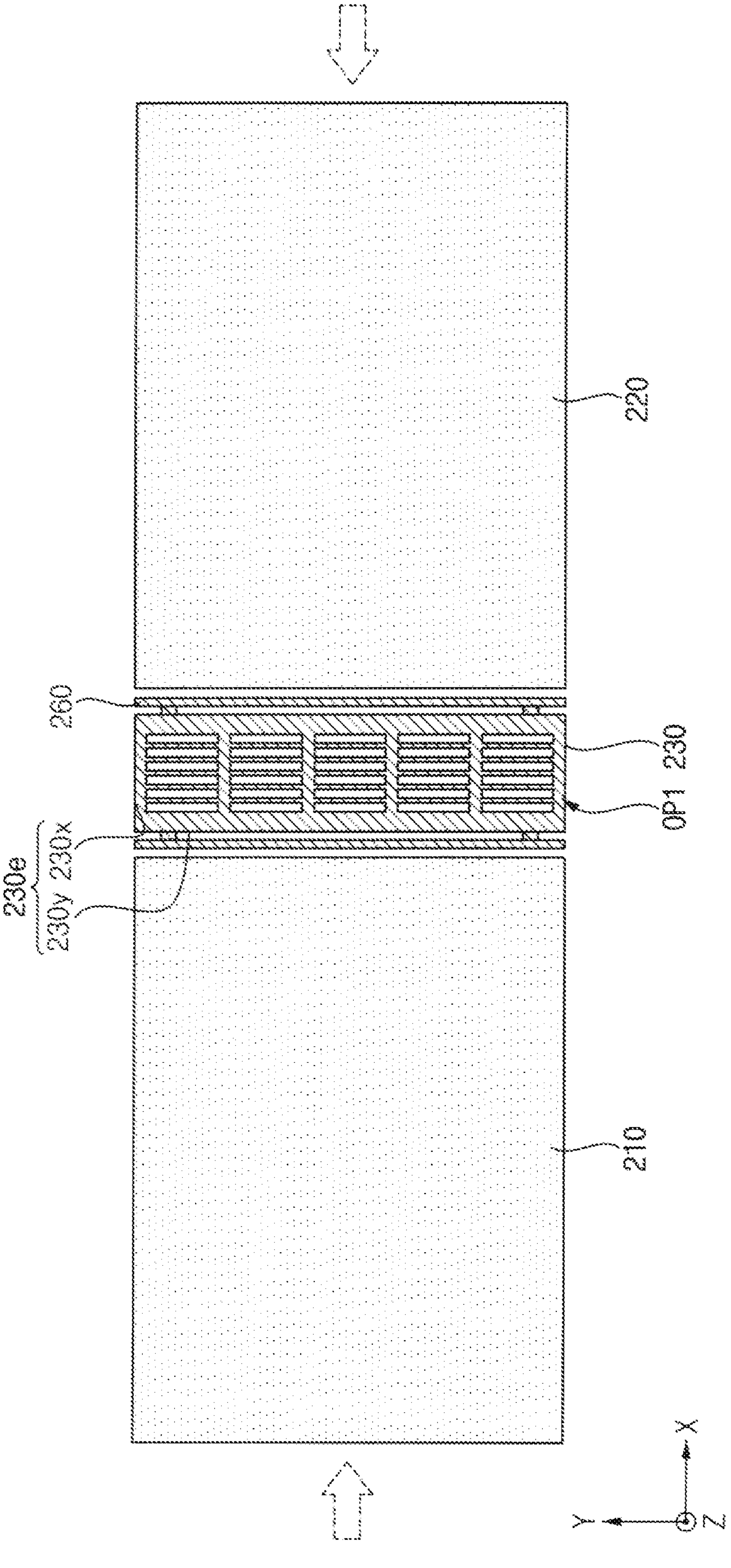

Referring to FIG. 19, the first body 210 and the second body 220 may be formed on opposite sides of the connector 230, respectively. The first body 210 and the second body 220 may be formed to be adjacent to opposite second side surfaces 230*y* of the connector 230 in the first direction X, respectively.

In an embodiment of the present disclosure, after the connector 230 is seated on a jig, the first body 210 and the second body 220 may be disposed on the jig to be adjacent opposite sides of the connector 230, respectively. A guide block may be disposed on the jig to maintain a predetermined distance between the connector 230 and the first and second bodies 210 and 220. The bridge 260 may be located within the predetermined distance between the connector 230 and the first and second bodies 210 and 220.

Figure 20:
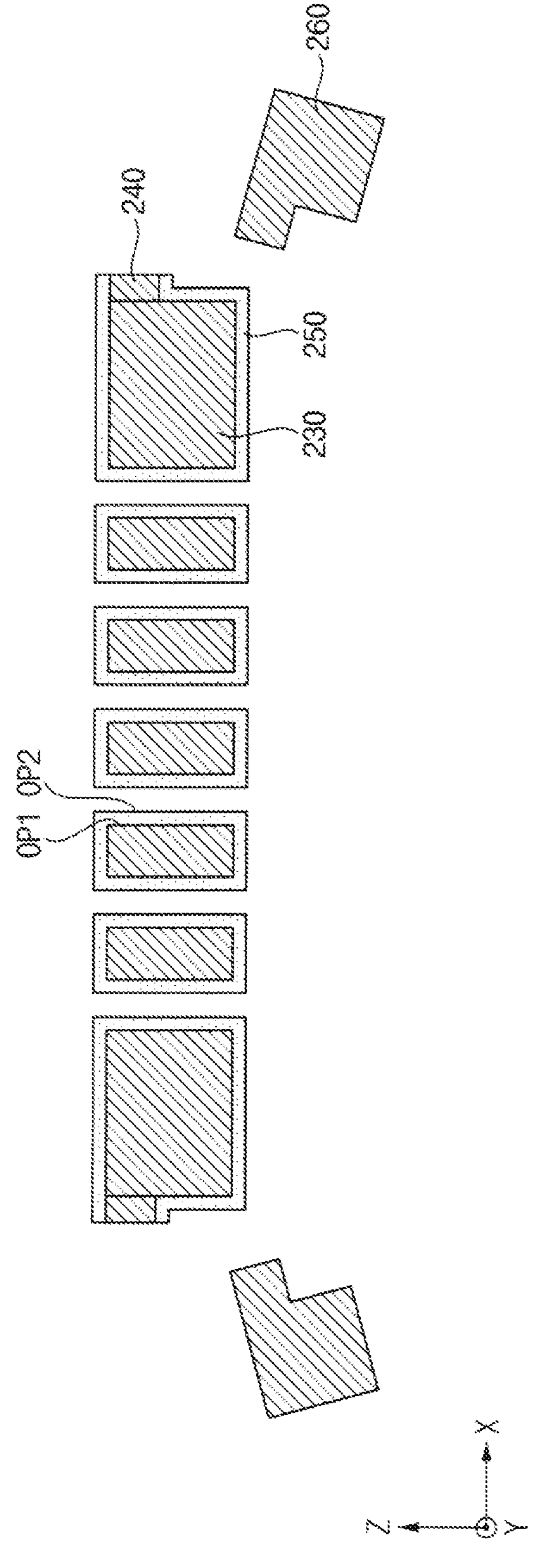

Referring to FIG. 20, the bridge 260 may be cut from the connector 230. In an embodiment of the present disclosure, the bridge 260 may be out by applying a physical force to the bridge 260 using a jig for removing the bridge 260.

In the process in which the bridge 260 is cut, a portion of the bridge 260 may remain on the edge 230*e* of the connector 230 to form the protrusion 240. In this case, a surface of the protrusion 240, which is a cut surface of the bridge 260, may be exposed to the outside. Although the surface of the protrusion 240 is exposed to the outside, since the first body 210, the second body 220, layers disposed over the support plate 202, and layers disposed under the support plate 202 cover the surface of the protrusion 240, electric charges supplied from the outside may not be accumulated in the connector 230 through the protrusion 240.

The display device according to the embodiments of the present disclosure may be applied to a display device included in a computer, a notebook, a mobile phone, a smart phone, a smart pad, a portable media player (PMP), a personal digital assistant (PDA), an MP3 player, or the like.

Although the display devices, the support plates, and the methods of manufacturing the support plates according to the aforementioned embodiments have been described with reference to the drawings, the illustrated embodiments are examples, and may be modified and changed by a person having ordinary knowledge in the relevant technical field without departing from the technical spirit of the present disclosure set forth in the following claims.

What is clamed is:

1. A display device, comprising:
- a display panel foldable around a folding axis extending in a first direction; and
- a support plate disposed under the display panel, the support plate including:
  - a first body;
  - a second body disposed in a second direction perpendicular to the first direction from the first body;
  - a connector disposed between the first body and the second body, overlapping the folding axis, and including a plurality of openings; and
  - an insulating layer covering first side surfaces of the connector that extend in the second direction and are disposed opposite each other along a third direction that crosses the first direction and the second direction, and second side surfaces of the connector that extend in the third direction and are disposed opposite each other along the second direction.

2. The display device of claim 1, wherein the support plate further includes a protrusion protruding from an edge of the connector.

3. The display device of claim 2, wherein the protrusion protrudes in the first direction from the edge of the connector.

4. The display device of claim 3, wherein the insulating layer covers a surface of the protrusion.

5. The display device of claim 2, wherein the protrusion protrudes in the second direction from the edge of the connector.

6. The display device of claim 5, wherein a surface of the protrusion is not covered by the insulating layer.

7. The display device of claim 1, wherein the insulating layer includes a plurality of openings respectively corresponding to the openings of the connector.

8. The display device of claim 1, further comprising:
- a digitizer disposed under the support plate.

9. The display device of claim 8, wherein the digitizer includes:
- a first portion disposed under the first body; and
- a second portion disposed under the second body, and spaced from the first portion.

10. The display device of claim 1, wherein the insulating layer includes chromium carbide (CrC) or an acrylic resin.

11. The display device of claim 1, wherein the connector includes stainless steel.

12. The display device of claim 1, wherein each of the first body and the second body includes polyethylene terephthalate (PET) or glass.

13. A support plate, comprising:
- a first body;

a second body disposed in a first direction from the first body;

a connector disposed between the first body and the second body, and including a plurality of openings;

an insulating layer covering first side surfaces of the connector that extend in a second direction perpendicular to the first direction and are disposed opposite each other along a third direction that crosses the first direction and the second direction, and second side surfaces of the connector that extend in the third direction and are disposed opposite each other along the second direction; and a protrusion connected to an edge of the connector.

14. The support plate of claim 13, wherein the protrusion extends in the first direction.

15. The support plate of claim 13, wherein the protrusion extends in the second direction.

16. The support plate of claim 13, wherein each of the connector and the protrusion includes stainless steel.

17. A method of manufacturing a support plate, the method comprising:

coating a surface of a connector connected to a bridge with an insulating material;

folding the bridge after coating the surface of the connector;

forming a first body and a second body on opposite sides of the connector, respectively, wherein the first and second bodies are formed after folding the bridge; and cutting the bridge from the connector.

18. The method of claim 17, wherein the surface of the connector is coated using a spray method or a deposition method.

19. The method of claim 17, further comprising:

coating a surface of a protrusion of the connector with the insulating material, the protrusion being exposed by cutting of the bridge.

20. The method of claim 19, wherein the surface of the protrusion is coated with a printing method.

21. An electronic device, comprising:

a display panel foldable around a folding axis extending in a first direction; and a support plate disposed under the display panel, the support plate including:

a first body;

a second body spaced apart from the first body in a second direction perpendicular to the first direction;

a connector disposed between the first body and the second body, the connector including a plurality of openings and a protrusion; and an insulating layer disposed on the connector, wherein the insulating layer includes a plurality of openings respectively corresponding to the openings of the connector.

22. The electronic device of claim 21, wherein the insulating layer covers the protrusion.

23. The electronic device of claim 21, wherein a surface of the protrusion is exposed by the insulating layer.

* * * * *